Sept. 2, 1958   V. R. BENNETT ET AL   2,850,010
FLUID PRESSURE IMPULSE TIMER
Filed Jan. 14, 1957
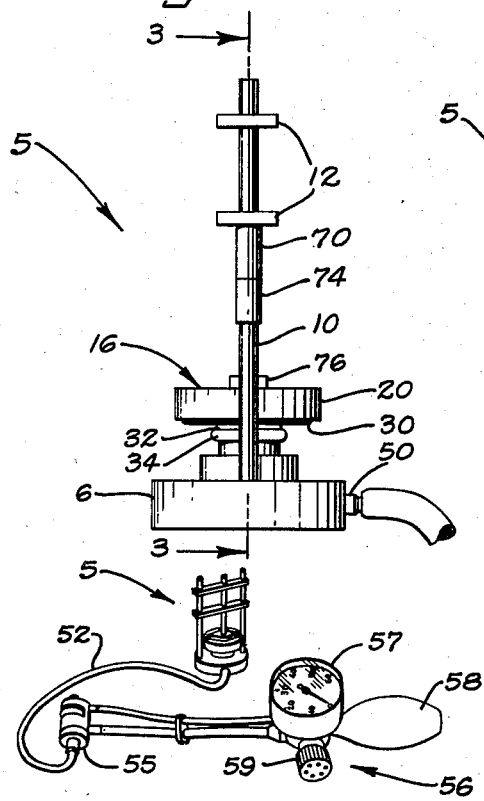
Fig_1
Fig_2
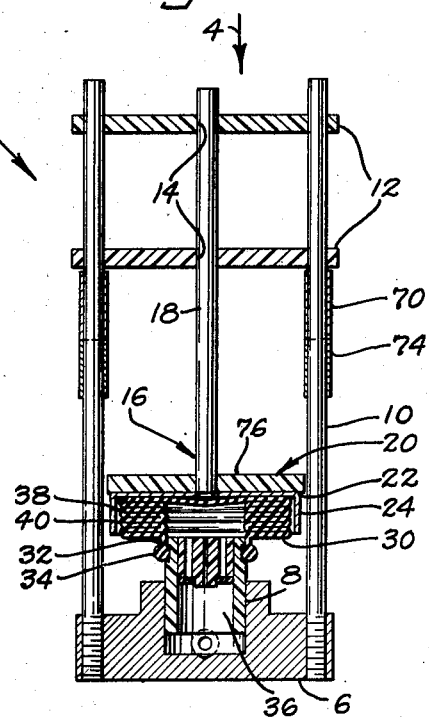
Fig_3
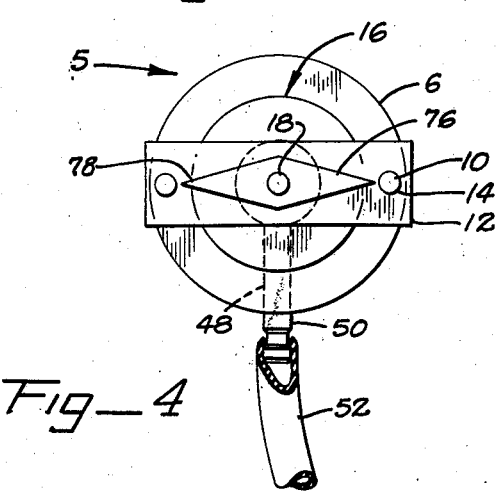
Fig_4
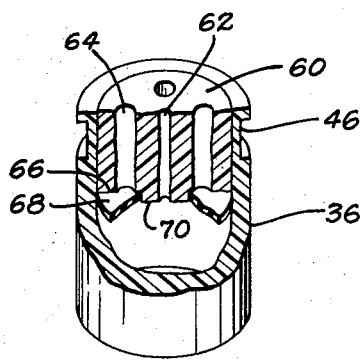
Fig_5
INVENTORS
V. Ray Bennett
Gordon W. Leavitt
BY
ATTORNEY

United States Patent Office 2,850,010
Patented Sept. 2, 1958

2,850,010

FLUID PRESSURE IMPULSE TIMER

Vivian Ray Bennett, Beverly Hills, and Gordon W. Leavitt, Santa Monica, Calif., assignors to Bennett Respiration Products, Inc., Los Angeles, Calif., a corporation of California Application January 14, 1957, Serial No. 633,899

10 Claims. (Cl. 128—29)

This invention relates to timing devices, and more particularly to a practice instrument for enabling an operator to acquire skill in operating an instrument for administering artificial respiration in accordance with a predetermined rhythym.

Instruments are available on the market for administering artificial respiration to infants who fail to start breathing at birth, or who breathe so imperfectly that the natural oxygen intake requires augmentation. Such instruments are desirably manually operable, rather than automatic, so that the operator can best regulate operation of the instrument in accordance with the infant's requirements. An example of such an instrument is the infant resuscitator forming the subject matter of my copending patent application, Serial No. 553,009, filed December 14, 1955, and entitled "Positive Pressure Breathing Apparatus."

It is to be observed, however, that the administration of artificial respiration to an infant is an operation of extreme delicacy, requiring the exercise of excellent professional judgment on the part of the attendant obstretician in determining the operational procedure best suited to the requirements of the individual infant receiving treatment. The periodicity of the treatment is of great importance since it is by subjecting the infant to forced breathing according to a rhythm closely approximating the natural respiratory pattern of a normal infant of similar physical characteristics that the child's muscular and reflex nervous systems can best be stimulated to take over the functions of inhalation and exhalation. However, there are many other considerations that require the practitioner's attention—for example, in addition to all of the functions of an obstretician attending a normal birth, he must determine if natural air or an artificial mixture of oxygen and other gases would be most beneficial. He likewise must determine the maximum safe pressure at which to effect delivery of gas to the infant. In fact, such requirements frequently vary during the course of administering artificial respiration to an infant, and therefore the attending obstretician must keep the infant constantly under close observation to detect promptly any symptom of change in the infant's condition requiring variation in operating technique.

All of these factors of operational procedure requiring observation and analysis by the obstretician make it a difficult matter for him to maintain the continuity and regularity of the rhythmical operation of the artificial respiration apparatus that is so important in attaining success in promptly and effectively causing the infant to commence natural breathing. It is highly desirable, therefore, that an obstretician apt to be called upon to employ a manually operable infant resuscitator train himself to operate the instrument so as to manually compress and release the pneumatic bulb of the resuscitator, in accordance with the rhythmical pattern considered most effective in inducing spontaneous breathing by an infant who exerts no respiratory effort at birth, or who is unable to breathe naturally.

It is an object of the present invention to provide an improved timing device.

It is another object of the present invention to provide a practice device adapted to facilitate the acquisition of skill in manipulating a manually operated infant resuscitator.

It is another object of the invention to provide a training instrument of the character indicated, which is effective in enabling an operator to so familiarize himself with a predetermined rhythmical pattern of squeezing and releasing a pneumatic bulb that he can dependably follow the same pattern under conditions apt to be encountered while attending birth of a child requiring artificial respiration.

Another object is to provide a training device wherein air is expelled from a manually compressible bulb against a resistance of predetermined magnitude closely approximating that against which air must be forced into an infant's lungs when administering artificial respiration.

Another object of the invention is to provide a timing device adapted to temporarily replace the conventional face mask or tracheotomy tube of an infant resuscitator, thus adapting the resuscitator for use as a practice instrument enabling a technician to acquire skill in operating the same in a manner recognized to be most efficacious in infant resuscitation.

Another object is to provide an interval timer adapted for connection to an infant resuscitator to adapt the same for use as a practice device as described, which affords a visual indication of how the rate of operation of the instrument as a practice device compares with the rate at which the resuscitator should be operated in actual use.

Another object is to provide an interval timer of the character described which is actuated by air delivered at a predetermined pressure to give a visual indication as to how the time interval during which such pressure is maintained compares with the time interval known to be most conducive to successful theapy of an infant in need of artificial resuscitation.

Another object in this connection is to provide an interval timer for use in connection with an infant resuscitator including a manually compressible pneumatic bulb and a pressure relief valve that operates to permit air to escape when the pressure thereof exceeds a predetermined optimum value, which timer includes an indicator that is responsive to the volume of air delivered thereto when coupled to the resuscitator, and which is calibrated to indicate how the rate at which the bulb of the resuscitator is squeezed compares with the rate at which it should be compressed when the resuscitator is in actual use, to achieve sufficient expansion of the infant's lungs without interfering with circulatory and cardiac functions.

The invention possesses other objects and features of advantage, some of which, with the foregoing, will be set forth in the following description of the preferred form of our invention which is illustrated in the drawings accompanying and forming part of the specification. It is to be understood that we do not limit ourselves to the showing made by the said drawings and description, as we may adopt variations of the preferred form within the scope of our invention as set forth in the claims.

Referring to the drawings:

Figure 1 is a side elevation, partly broken away, of the manually operable interval timer of the present invention.

Figure 2 is a perspective drawn to a reduced scale, showing the interval timer of the invention operatively associated with an infant resuscitator.

Figure 3 is a vertical sectional view taken along the line 3—3 of Fig. 1, and drawn to an enlarged scale.

Figure 4 is a plan of the interval timer viewed as indicated by the arrow 4 of Fig. 3, portions being broken away.

Figure 5 is an enlarged perspective of the valve and valve housing for regulating flow to and from the timer.

In its illustrated embodiment, the interval timer 5 of the present invention comprises a base 6 having therein a central, upwardly opening socket 8 and two diametrically opposed guide rods 10 rigidly secured thereto at their lower ends and extending vertically upward therefrom. The two vertical guide rods 10 are rigidly interconnected by two vertically spaced horizontal bars 12 having vertically aligned round holes 14 therein. A plunger 16 is mounted for free vertical reciprocatory movement above the base 6 by having its stem 18 slidably mounted in the holes 14. The head 20 of the plunger is circular in plan, and includes a disc-like body portion 22 to which the stem 18 is rigidly secured in axial relation thereto, and a flange 24 depending from the periphery of the body portion 22.

A cylindrical bellows 30 of rubber or rubber-like material is mounted on the base 6 beneath the plunger 20. The upper end of the bellows 30 is closed and is confined within the peripheral flange 24. The bellows 30 terminates at its lower end in a neck 32, having at its end a reinforcing bead 34 that must be stretched slightly to insert the upper end of a tubular valve housing 36 thereinto so that the inherent resilience of the rubber of which the neck 32 and bead 34 are composed firmly retains the bellows in position upon the valve housing 36 with the bore of the housing 36 in communication with the interior of the bellows 30.

The cylindrical side wall 38 (Fig. 3) of the bellows 30 is formed into a series of deep annular pleats 40 which, when the bellows 30 are collapsed, are superimposed one upon another, as shown in Fig. 3. The pleats 40 reinforce the bellows in a manner preventing radial expansion thereof, but the pleats 40 are highly flexible in an axial direction so that when air is forced into the bellows 30, the bellows expands axially, and since the lower end of the bellows is secured to the valve housing which in turn is stationary with the base, as is about to be explained, the upper end of the bellows 30 rises as the bellows expands. This raises the plunger 20, and since the only force that resists upward motion of the plunger 20 is the force of gravity (disregarding friction, which is so slight as to be negligible) the resistance that the plunger meets as it rises is of definite, fixed magnitude and is constant throughout the entire range of movement of the plunger.

The valve housing 36 seats within the socket 8 of the base 6 and is provided with an annular groove 46 (Fig. 5) adapted to receive the bead 34 at the lower end of the neck 32 of the bellows 30 to assist in securely retaining the parts in assembled relation. A radially extending hole 48 (Fig. 4) in the base 6 communicates with the socket 8, and a nipple 50 threadedly engaged within the outer end of the hole 48 provides means for securing one end of a length of rubber tubing 52 to the base 6 with the bore of the tubing 52 in communication with the socket 8. A nipple 55 at the other end of the tube 52 is adapted to be inserted into the socket of an infant resuscitator 56 that is adapted to receive the nipple of a face mask (not shown) or that of a tracheotomy tube (not shown) so that the air or other gas that would, in actual use of the resuscitator to administer artificial respiration, be delivered by the mask or tracheotomy tube to an infant patient, will instead be discharged into the tube 52 and by it conveyed to the interior of the interval timer 5 of the present invention.

Although the timer 5 of the present invention is adapted for use in connection with any suitable resuscitating apparatus of corresponding capabilities, it is illustrated in Fig. 2 as being operatively connected to an infant resuscitator 56 such as that forming the subject matter of my copending application, Serial No. 553,009, filed December 14, 1955, to which reference may be had for a full description of its constructional details and manner of operation. It will suffice for the purposes of the present disclosure to explain that the resuscitator 56 is provided with a pressure gauge 57 that gives a visual indication of the pressure at which air or other gas is delivered to the face mask, tracheotomy tube, or the interval timer of the present invention, depending upon which is operatively connected to the resuscitator 56. The pressure is generated by a manually compressible pneumatic bulb 58, and a pressure relief valve (not shown) is regulable by means of a threadedly mounted adjusting cap 59.

A plug 60 is firmly fitted into the bore of the tubular valve housing 36 at the upper end thereof. A small diameter port 62 extending axially through the plug 60 constantly maintains restricted communication between the bore of the housing 36 and the interior of the bellows 30, permitting air to be forced into the bellows only somewhat slowly, regardless of the force exerted in squeezing the bulb 58. More rapid exhaust of air from the bellows 30 is made possible by a plurality of relatively large outlet ports 64 through the plug, arranged in an annular series encircling the inlet port. The lower ends of the outlet ports 64 terminate in an annular recess 66 in the lower end of the plug 60, and an annular flap valve 68 of rubber or rubber-like material is retained within the recess 66 by an axial boss 70 projecting from the lower end of the plug 60, on which the valve 68 is engaged by being stretched slightly to permit insertion of the boss into the central opening of the annular valve 68. When air pressure below the plug 60 is greater than that within the bellows 30, the valve 68 is pressed into closing relation with the lower ends of the outlet ports 64, thus limiting entrance of air into the bellows 30 to flow through the single, restricted inlet port 62. Under conditions of reversed pressure differential air escapes from the bellows 30 through all of the ports 62 and 64, thus permitting rapid collapse of the bellows 30 and correspondingly rapid return of the plunger to its lowest position.

A wrapping 70 of red tape is placed upon each of the guide rods 10 immediately below the lower horizontal bar 12, and a similar wrapping 74 of green tape is placed on each guide rod 10 immediately below the red tape 70 thereon. These contrastingly colored tapes 70 and 74 serve as indicia that co-operate with a pointer 76 carried by the plunger 30 immediately above the head 20, in giving a visual indication of the height to which the plunger is raised. The tips of the pointer 76 are colored green, as indicated at 78 (Fig. 4). Consequently, when the pointer 76 registers with the red tapes 70, the sharp contrast between the color of the red tapes 70 and the immediately adjacent green pointer tips 78 yields a particularly striking visual signal indicating that the period during which air has been supplied to the instrument has been longer than that required to raise the pointer into the region of the green tape 74.

When the interval timer of the present invention is connected to an infant resuscitator 56 as indicated in Fig. 2, so that it takes the place of the face mask or tracheotomy tube that is employed when the resuscitator is in actual use, the bellows 30 will expand and the plunger 16 will rise under the influence of air delivered thereto under pressure generated by squeezing the bulb 58 of the resuscitator.

Preferably the bulb 58 is of such size that upon being collapsed as fully as possible by manual squeezing, it expels slightly more than the quantity of air that has been found to be the most desirable to administer in performing the inhalation phase of the respiratory cycle of a newly born infant requiring artificial respiration. It is intended that the bulb 58 be completely collapsed during each cycle, to insure administering the desired quantity of air at the desired pressure and within the desired time interval. The pressure factor is taken care of by setting the relief valve (not shown) of the resuscitator to release air when the pressure within the instrument exceeds the desired value, thus leaving only the time factor to be taken care of by the manner of squeezing the bulb.

It has been found that pressure as high as 50 centimeters of water can be used advantageously and safely in artificially expanding the lungs of an atelectatic infant, provided the period during which air at such pressure is forced into the lungs is of very short duration. A period of the order of from 0.3 to 0.5 second is usually the most advantageous for the inhalation phase of the respiratory cycle. Therefore, when operating the resuscitator, its relief valve should normally be set to open when a pressure in excess of 50 cc. of water is exceeded, and the bulb should be squeezed at a rate that will fully collapse the same within the prescribed interval of approximately a half second or less. Immediately thereafter, the bulb should be completely released, so that the air that has been forced into the lungs can be exhaled. This exhalation phase of the respiratory cycle will extend over a period of the order of from 0.6 to 0.8 second. Consequently, in operating the resuscitator, the technician should permit an interval of slightly more than from 0.6 to 0.8 second to elapse before again squeezing the bulb of the resuscitator to initiate the succeeding respiratory cycle.

Thus it may be seen that the obstetrician is required to operate the resuscitator in a manner following a difficult rhythm with a great degree of precision, and in view of the fact that many other details must likewise be taken care of at the same time, it is highly desirable that he so accustom himself to the operation of the instrument, and that he familiarize himself with the optimum rhythm of its operation, that he can properly manipulate the apparatus without having to devote his entire attention to the operation thereof. The interval timer of the present invention provides means for adapting the resuscitator for use as a practice instrument enabling the obstetrician to acquire such skill in operating the same that he can successfully administer artificial respiration therewith without having to concentrate his entire attention to the operation of the resuscitating apparatus.

The inlet port 62 of the timer 5 of this invention is of such size that when air at a pressure corresponding to 50 centimeters of water is supplied to the timer for a period of 0.3 of a second, the pointer 76 will rise to the lower edge of the green tape 74, whereas if the same pressure is maintained for an additional 0.2 of a second, the pointer 76 will rise to the upper edge of the green tape 74. Thus, when the interval timer of the present invention is connected to the resuscitator 56 in the manner illustrated in Fig. 2, the timer can be observed to ascertain whether the bulb 58 is being squeezed in the manner corresponding to that in which the bulb should be squeezed when employing the resuscitator in actual use.

From the above description it will be appreciated that if the bulb 58 is squeezed too forcefully, the pressure within the resuscitator will rise to a value so far above the desired 50 centimeters of water that more than the desired quantity of air will escape through the relief valve, and the bulb 58 will be fully collapsed before the pointer 76 rises to the level of the green wrappings 74.

On the other hand, if the bulb is not squeezed rapidly enonugh, the pressure of air within the resuscitator will not rise to a value above that for which the relief valve is set. Under these circumstances, therefore, more than the desired quantity of air will enter the bellows 30 when the bulb 58 is fully collapsed, and the pointer 76 will be raised to a position opposite the red wrappings 70, giving the operator warning that the period during which the bulb has been squeezed has exceeded the 0.5 of a second that is considered the maximum safe time duration for the inhalation phase of the cycle of administering air to an atelectatic infant.

Thus it may be seen that by observing the height to which the pointer 76 rises with relation to the colored wrappings 70 and 74, the operator is afforded a readily interpreted indication of the relationship that the rate at which he has squeezed the bulb 58 bears to the rate at which it should be squeezed to attain the safest and most beneficial results in administering artificial respiration to an infant in an atelectatic condition. As far as the interval for the entire respiratory cycle is concerned, it has been found that if the operator speaks aloud the words "squeeze, release, pause" while correspondingly operating the bulb 58, and if the pointer 76 rises to the level of the green wrappings 74 at the end of each squeezing operation and the plunger drops all the way to the bottom of its stroke before the next squeezing phase is initiated, the optimum overall interval as well as the optimum interval for each of the three phases of the cycle is being maintained. Therefore, the interval timer 5 of the present invention, when operably connected to a resuscitator 56, enables an operator to inform himself as to whether he is operating the resuscitator at the rate that is most desirable when putting the instrument to actual use. Moreover, by practicing operation of the resuscitator with the aid of the interval timer as hereinabove described, the operator will become so accustomed to the proper rhythm that he will be enabled to use the resuscitator under operating room conditions, accurately in accordance with the desired rhythm, and without having to devote his full attention to the matter, thus making it possible for him to take care of whatever other details might require his attention while administering artifical respiration to the infant.

Having thus described our invention, what we believe to be new and desire to protect by Letters Patent is:

1. A fluid actuated interval timer comprising an upwardly expandable and downwardly collapsible container, means for introducing fluid under pressure to the container, indicating means mounted on the container for movement proportionally with expansion thereof, means providing a stationary reference point with which said indicator co-operates, means providing a mass resting on the container and acting under the influence of gravity to collapse the container when pressure therewithin is relieved, and means predetermining rates of flow into and out of the container.

2. A fluid actuated interval timer comprising an upwardly expandable and downwardly collapsible container, means for introducing fluid under pressure to the container, indicating means mounted on the container for movement proportionally with expansion thereof, means providing a reference point with which said indicator co-operates, means providing a mass resting on the container and acting under the influence of gravity to collapse the container when pressure therewithin is relieved, and means for restricting flow of fluid into the container to a predetermined rate.

3. A fluid actuated interval timer comprising an upwardly expandable and downwardly collapsible container, means for introducing fluid under pressure to the container, means for indicating extent of expansion of the container, means providing a mass resting on the container and acting under the influence of gravity to collapse the container when pressure therewithin is relieved, means for restricting flow of fluid into the container to a predetermined rate, means providing an outlet port bypassing said flow restricting means, and a check valve operative to close said outlet port when fluid is flowing into the container.

4. A practice device for facilitating acquisition of manipulative skill, comprising a base, a bellows mounted on the base, said bellows being vertically expandable in response to flow of air thereinto, means for introducing air under pressure to the bellows, and a plunger slidably supported from the base for free vertical reciprocatory movement and resting upon the bellows to present constant resistance of predetermined magnitude to expansion of the bellows and to return the bellows to collapsed condition upon release of pressure therewithin, and means for restricting flow of air into and out of the bellows to predetermined different rates.

5. A practice device for facilitating acquisition of manipulative skill, comprising a base, a bellows mounted on the base, said bellows being vertically expandable in response to flow of air thereinto, means for introducing air under pressure into the bellows, a plunger slidably supported from the base for free vertical reciprocatory movement and resting upon the bellows to present constant resistance of predetermined magnitude to expansion of the bellows and to return the bellows to collapsed condition upon release of pressure therewithin, and a by-pass check valve interposed between the air-introducing means and the bellows to restrict flow of air into bellows and permit relatively rapid escape of air from the bellows.

6. A practice device for facilitating acquisition of manipulative skill, comprising a base, a bellows mounted on the base, said bellows being vertically expandable in response to entrance of air thereinto, means for introducing air to the bellows, a plunger slidably supported from the base for free vertical reciprocatory movement and resting upon the bellows to present constant resistance of predetermined magnitude to expansion of the bellows and to return the bellows to collapsed condition upon release of pressure therewithin, a pointer carried by the plunger, and an indicium supported from said base in position to be in alignment with said pointer when said bellows attains a predetermined degree of expansion, and means for restricting flow of air into and out of the bellows to predetermined different rates.

7. A practice device for facilitating acquisition of manipulative skill, comprising a base, a bellows mounted on the base, said bellows being vertically expandable in response to entrance of air thereinto, means for introducing air to the bellows, a plunger slidably supported from the base for free vertical reciprocatory movement and resting upon the bellows to present constant resistance of predetermined magnitude to expansion of the bellows and to return the bellows to collapsed condition upon release of pressure therewithin, a by-pass check valve interposed between the air-introducing means and the bellows to restrict flow of air into bellows and permit relatively rapid escape of air from bellows, a pointer carried by the plunger, and an indicium supported from said base in position to be in alignment with said pointer when said bellows attains a predetermined degree of expansion.

8. In combination with apparatus for administering artificial respiration including means for supplying gas at a predetermined pressure, a time interval timer comprising an expandable container, means for connecting the container to the respiration administering apparatus to receive gas therefrom, means restricting flow into the container to a predetermined rate, and means operative in response to expansion of the container for indicating when said container has attained a predetermined degree of expansion.

9. In combination with apparatus for administering artificial respiration including means for supplying gas at a predetermined pressure, a timer for indicating the length of time that gas is supplied at said pressure by said apparatus comprising an expandable container, means for connecting the container to the respiration administering apparatus to receive gas therefrom, means restricting flow into the container to a predetermined rate, means operative in response to expansion of the container for indicating when said container attains a predetermined degree of expansion, and means for returning the container to collapsed condition upon release of pressure therewithin.

10. In combination with apparatus for administering artificial respiration including a pneumatic bulb compressible manually to discharge a predetermined quantity of air into a manifold passage, an air discharge conduit communicating with said manifold passage, and pressure responsive means for releasing air from said manifold passage when pressure therein exceeds a predetermined value, a timer for indicating the length of time during which air is discharged by said apparatus comprising a base, a bellows mounted on the base, said bellows being vertically expandable in response to entrance of air thereinto, means connecting the bellows to the manifold passage of said respiration administering apparatus to receive air therefrom, a vertically movable plunger slidably supported from said base and resting on said bellows, means for restricting flow of air into said bellows to a predetermined rate, and means operable in response to movement of the plunger for indicating attainment by said bellows of a predetermined expanded condition.

References Cited in the file of this patent

UNITED STATES PATENTS

| 1,337,225 | Heald | Apr. 20, 1920 |
| 1,641,817 | Knipping | Sept. 6, 1927 |
| 2,192,799 | Perrill | Mar. 5, 1940 |
| 2,592,694 | Heidbrink | Apr. 15, 1952 |